United States Patent [19]

Sugiura et al.

[11] Patent Number: 4,934,796
[45] Date of Patent: Jun. 19, 1990

[54] ZOOM LENS

[75] Inventors: Muneharu Sugiura, Tokyo; Akihisa Horiuchi, Kanagawa; Hiroyuki Hamano, Kanagawa; Nobuyoshi Suzuki, Kanagawa; Hitoshi Mukaiya, Saitama, all of Japan

[73] Assignee: Canon Kabushiki Kaisha, Tokyo, Japan

[21] Appl. No.: 417,694

[22] Filed: Oct. 5, 1989

[30] Foreign Application Priority Data

Oct. 7, 1988 [JP] Japan .................................. 63-253456

[51] Int. Cl.⁵ ........................ G02B 15/14; G02B 13/18
[52] U.S. Cl. ....................................... 350/427; 350/432
[58] Field of Search .................. 350/423, 427, 432–435

[56] References Cited

U.S. PATENT DOCUMENTS

| | | | |
|---|---|---|---|
| 4,621,905 | 11/1986 | Kato et al. | 350/427 |
| 4,770,510 | 9/1988 | Mukaiya | 350/427 |
| 4,812,024 | 3/1989 | Mukaiya | 350/427 |
| 4,832,471 | 5/1989 | Hamano | 350/427 |
| 4,846,563 | 7/1989 | Mukaiya | 350/427 |

Primary Examiner—Scott J. Sugarman
Attorney, Agent, or Firm—Fitzpatrick, Cella, Harper & Scinto

[57] ABSTRACT

A zoom lens comprising, from front to rear, a positive first group for focusing, a negative second group as the variator, a negative third group as the compensator, a positive fourth group and a fifth group as the relay lens, the fourth group in the form of a bi-convex singlet and the fifth group in two parts with a widest spacing therebetween, of which the front part comprises a bi-convex first lens, a negative second lens whose front surface is concave toward front, and a positive third lens whose front surface is of strong curvature, and the rear part comprises a negative lens whose rear surface is concave toward rear, a bi-convex lens and a positive lens whose front surface is of strong curvature, satisfying the following conditions:

$$3.9 < f4/fw < 4.5$$

$$3.7 < f5F/fw < 5.2$$

$$1.0 < R5,2/R5,3 < 1.6$$

$$1.4 < (D5F-D5R)/fw < 1.75$$

where f4 and f5F are the focal length of the fourth group and the front part of the fifth group, (D5F–D5R) is the spacing between the front and rear parts, R5,2 and R5,3 are the radii of curvature of the rear surface of the first lens and the front surface of the second lens, and fw is the shortest focal length of the entire system.

3 Claims, 6 Drawing Sheets

ZOOM LENS

BACKGROUND OF THE INVENTION

1. Field of the Invention:

This invention relates to zoom lenses and, more particularly, zoom lenses of increased aperture ratio to an F-number of 1.2 with a high zoom ratio of about 10, while still preserving good optical performance over the entire zooming range, suited to photographic cameras or video cameras.

2. Description of the Related Art:

For the photographic camera or video camera there has been demand for zoom lenses having a large aperture ratio and a high zoom ratio and yet having a high optical performance. Of these, the zoom lens for the video camera for home use is required to have a high resolving power of, for example, 500 lines/mm in spatial frequency over the entire area of the picture frame, as the number of resolving cells in the image sensor such as CCD increases and the recording method improves to the S-VHS or the like.

Besides this, because, in the commonly available video cameras, the image sensor has relatively low sensitivity, the aperture ratio of the zoom lens must be as large as possible.

It is known to provide a zoom lens whose F-number is on the order of 1.4 and whose zooming range is on the order of 10 as, for example, disclosed in Japanese Laid-Open Patent Applications Nos. Sho 54-17042 and 54-23556. In these documents, there has been made a proposal for using five lens groups, or a so-called five component type comprising, from front to rear, a first lens group of positive power for focusing, a second lens group of negative power for varying the image magnification, a third lens group for compensating for the image shift resulting from the variation of the image magnification, a fourth lens group for making afocal the light leaving from the third lens group, and a fifth lens group for forming an object image.

In general, to achieve great increases of the aperture ratio and the zooming range at once in such a manner that high optical performance is preserved, it is of great value to increase the number of lens elements or to weaken the refractive power of each lens group. These techniques of using so many lens elements and decreasing the refractive powers of all the lens groups have, however, to increase the physical length and the lens diameter, and, therefore, are not very suited to be applied to the zoom lens for the handy video camera, as it is of great importance to minimize its bulk and size and the weight.

Also, with the F-number, if increased, the lens diameter is advantageously minimized. But such a zoom lens is not very suited to the video camera using the image sensor of low sensitivity.

The related art to the present invention is disclosed in U.S. Pat. Nos. 4,812,024 and 4,832,471 and U.S. patent applications Ser. No. 156,935 filed on Feb. 17, 1988 now U.S. Pat. No. 4,846,563, Ser. No. 301,951 filed on Jan. 26, 1989, Ser. No. 223,108 filed on Jul. 22, 1988 and Ser. No. 355,348 filed on May 23, 1989.

SUMMARY OF THE INVENTION

A first object of the invention is to provide a zoom lens of good optical performance despite achievement of a minimization of the size.

A second object is to provide as fast a zoom lens as 1.2 in F-number.

BRIEF DESCRIPTION OF THE DRAWINGS

In these graphic representations, FIGS. 2(A), 3(A) and 4(A) show the aberrations in the wide-angle end, FIGS. 2(B), 3(B) and 4(B) in the middle position, and FIGS. 2(C), 3(C) and 4(C) in the telephoto end.

In these figures, the first, second, third, fourth and fifth lens groups are indicated at I, II, III, IV and V respectively, the front lens group and the rear lens group in the fifth lens group being denoted by V-1 and V-2 respectively, $\Delta M$ represents the meridional image surface, $\Delta S$ the sagittal image surface, d the spectral d-line, g the spectral g-line, and SP denotes a stop.

DETAILED DESCRIPTION OF THE PREFERRED EMBODIMENTS

Figure 1:
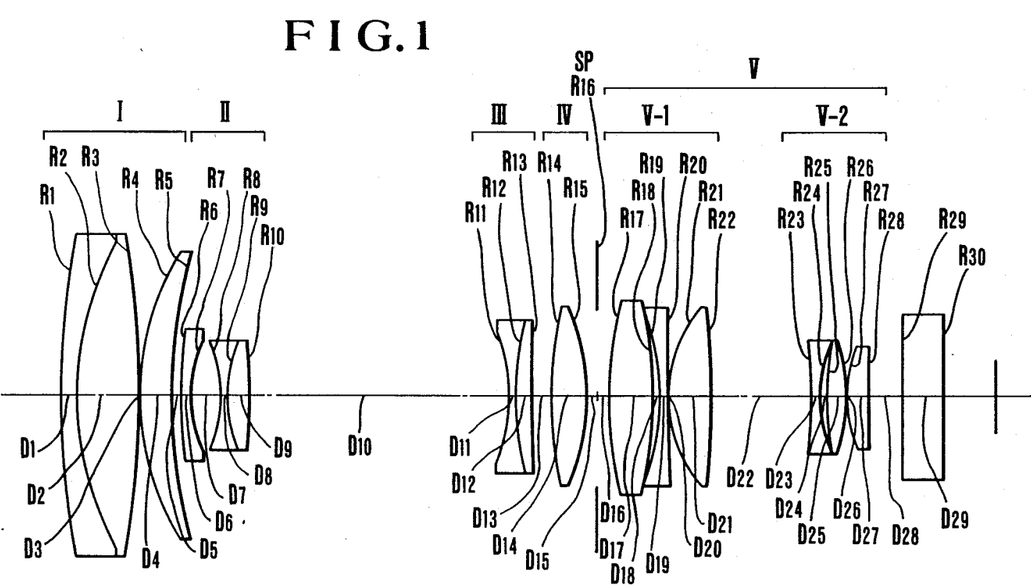
FIG. 1 is a longitudinal section view of a numerical example of a zoom lens of the invention.
Figure 2A:
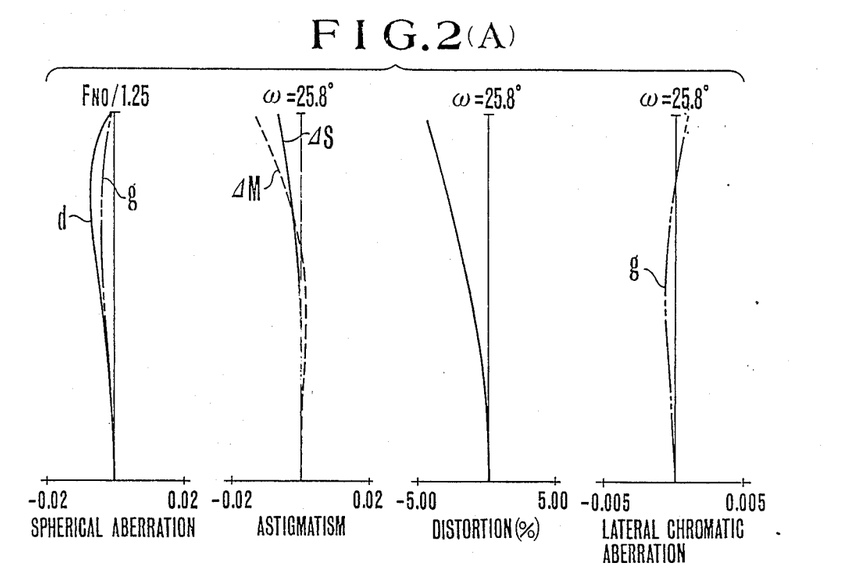
FIGS. 2(A) to 2(C), 3(A) to 3(C) and 4(A) to 4(C) are graphic representations of the aberrations of numerical examples 1–3 of the invention respectively.
Figure 2B:
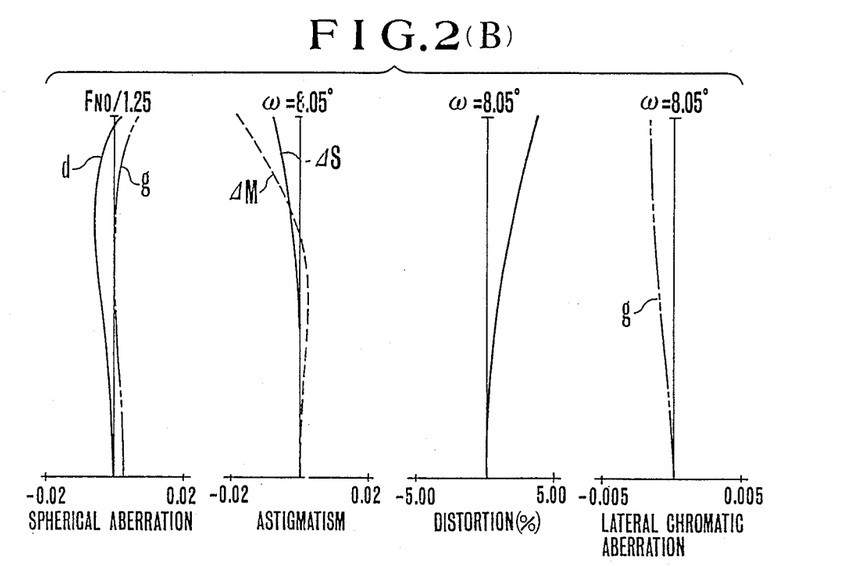
Figure 2C:
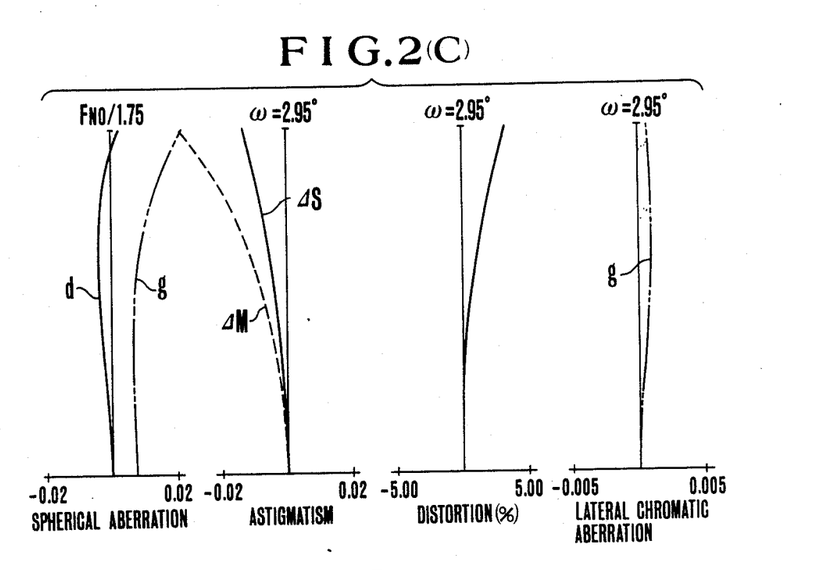
Figure 3A:
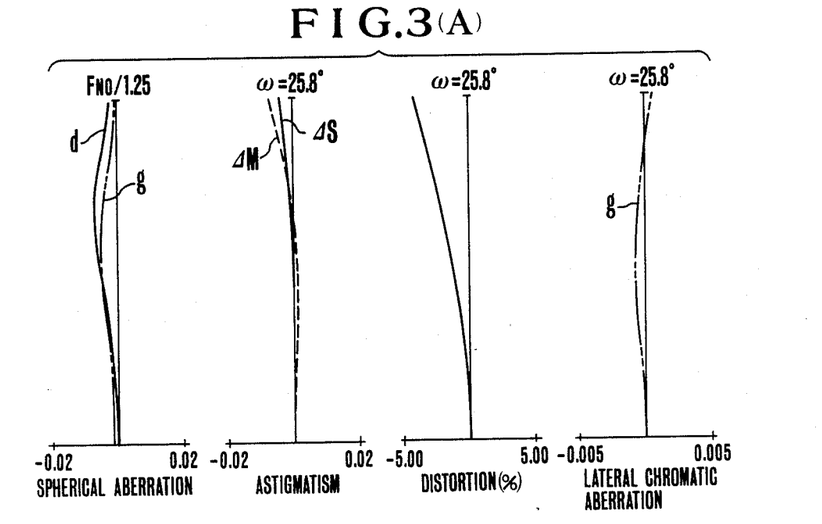
Figure 3B:
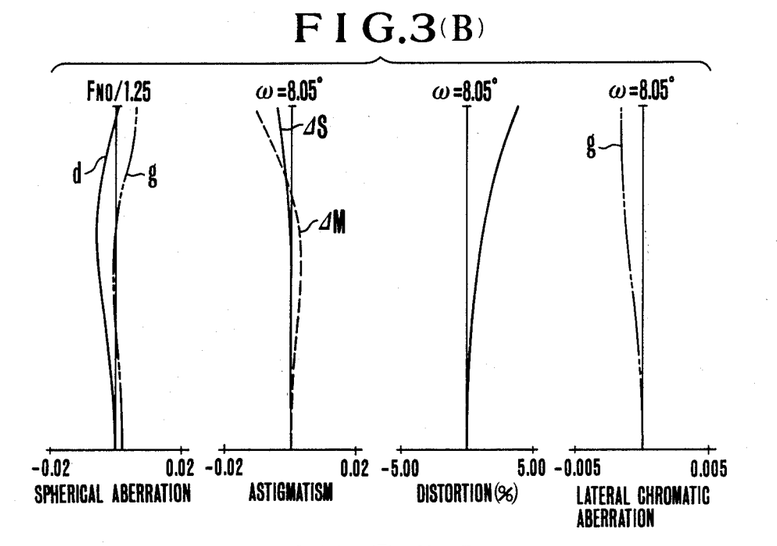
Figure 3C:
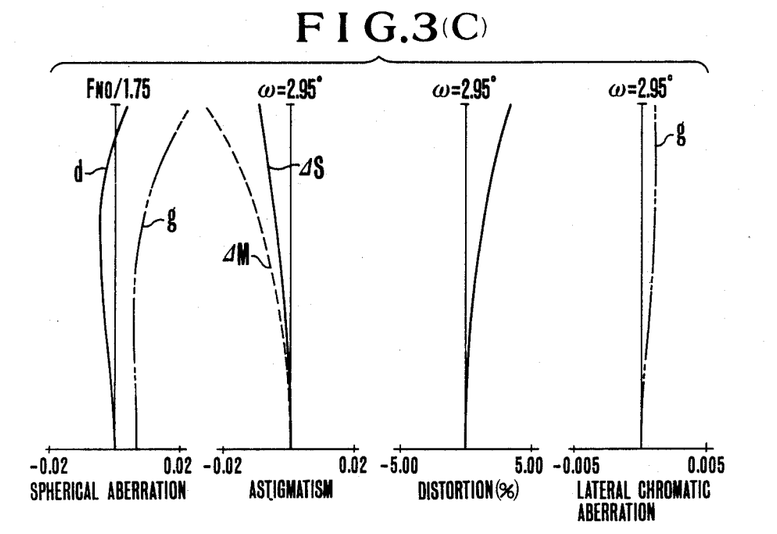
Figure 4A:
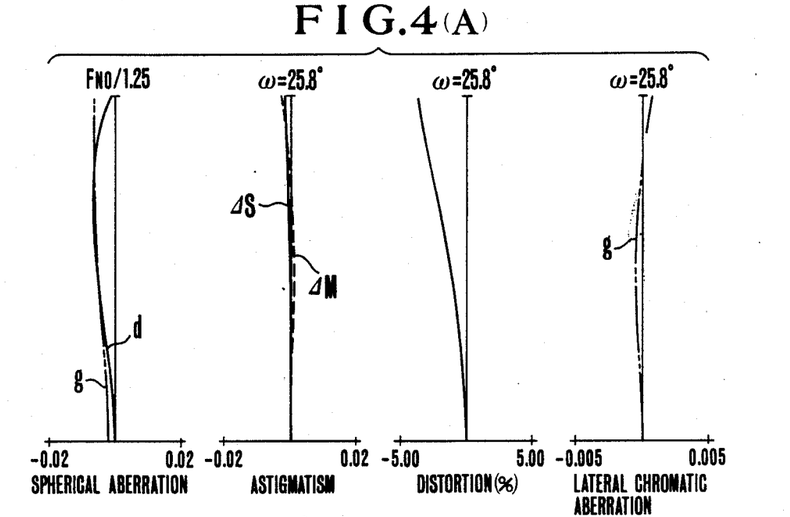
Figure 4B:
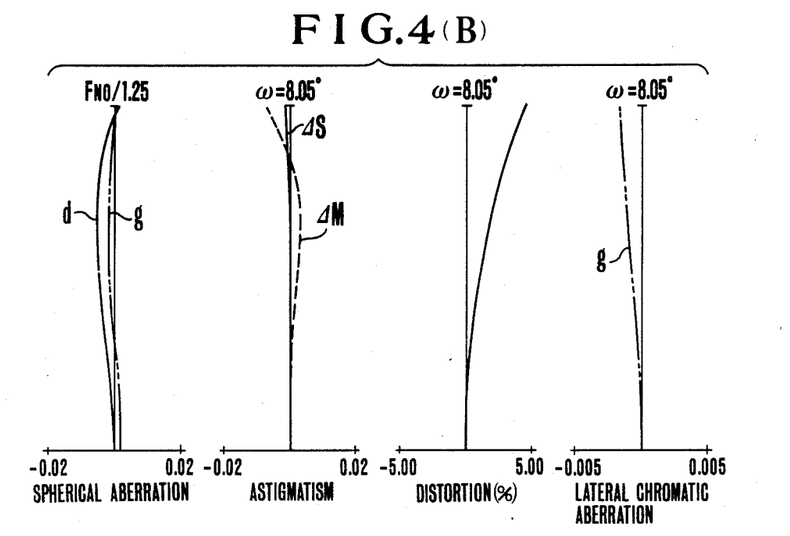
Figure 4C:
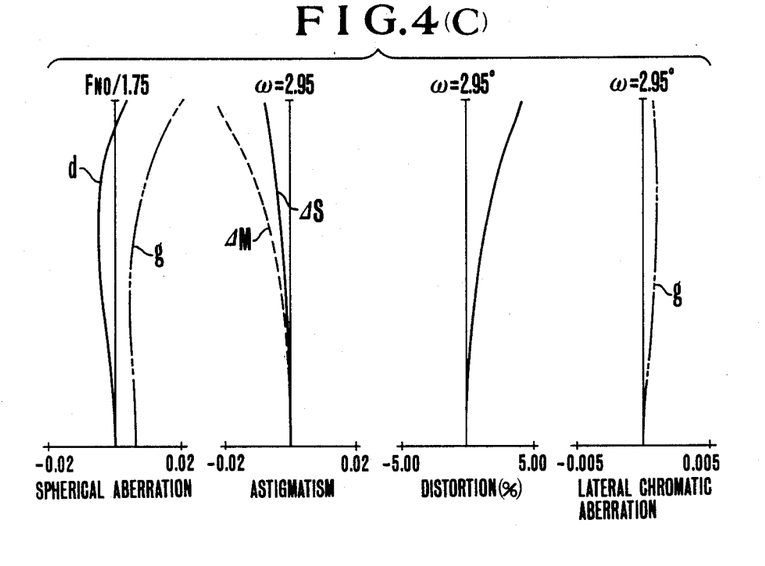

In FIG. 1, there is shown a specific embodiment of a zoom lens according to the present invention, comprising, from front to rear, a first lens group I of positive refractive power for focusing, a second lens group II of negative refractive power for varying the image magnification, a third lens group III of negative refractive power for compensating for the shift of an image plane resulting from the variation of the image magnification, the second and third lens groups II and III, when zooming, moving along a common optical axis according to respective predetermined zooming loci, a fourth lens group IV of positive refractive power having an image forming function, which is stationary during zooming, and a fixed fifth lens group V having an image forming function and including a front lens group V-1 and a rear lens group V-2 with a widest air separation as the boundary. A stop SP is positioned in axially fixed relation.

The present invention in application to such a zoom type has features that the fourth lens group IV is constructed with a lens of which both surfaces are convex with the rear surface of strong curvature, the front lens group V-1 with a first lens of which both surfaces are convex, a negative second lens of which the front surface is concave toward the front, and a positive third lens of which the front surface is of strong curvature, and the rear lens group V-2 with a negative fourth lens of which the rear surface is concave toward the rear, a fifth lens of which both surfaces are convex, and a positive sixth lens of which the front surface is of strong curvature, these lens groups IV, V-1 and V-2 satisfying the following conditions:

$$3.9 < f4/fw < 4.5 \tag{1}$$

$$3.7 < f5F/fw < 5.2 \tag{2}$$

$$1.0 < R5,2/R5,3 < 1.6 \tag{3}$$

$$1.4 < (D5F-D5R)/fw < 1.75 \tag{4}$$

where f4 and f5F are the focal lengths of the fourth lens group and the front lens group, (D5F−D5R) is the axial air separation between the front and rear lens groups, R5,i is the radius of curvature of the i-th lens surface counting from the front in the fifth lens group, and fw is the shortest focal length of the entire system. When these features or conditions are satisfied, the aberrations of the zoom lens of increased aperture ratio and extended range are well corrected for high grade imaging performance throughout the entire range of variation of the magnification.

Particularly with the fourth lens group in the form of a bi-convex singlet whose rear surface has a stronger refracting power than its front surface has and the front and rear lens groups each comprised of three lenses in the specified forms as described above, it is made possible to correct the residual aberrations, for example, spherical and comatic aberrations, of the varifocal section in good balance while maintaining a minimization of the total length of the zoom lens to be achieved.

Also, in numerical examples of specific zoom lenses to be described later, at least one lens surface of the front lens group, for example, the front lens surface of the first lens at which the diameter of the light beam takes a maximum value, is selected for application of an aspheric sphere, thereby giving an additional advantage that the off-axis aberrations such as the curvature of field, coma and sagittal halo and the spherical aberration are corrected excellent at an increased relative aperture of 1.2 in F-number to obtain a high contrast image.

The technical significance of each of the above-defined inequalities of conditions is explained below.

The inequalities of condition (1) concern with the refractive power of the fourth lens group and has a main aim to make the light beam emerging from the fourth lens group so divergent that even if the fifth lens group is more or less moved by focus tracking, the variation of the aberrations is limited to a minimum. When the refractive power of the fourth lens group is too weak beyond the upper limit of the inequalities of condition (1), the variation of the aberrations resulting from the focus tracking movement of the fifth lens group increases. Hence the deterioration of the optical performance due to the error with which the zoom lens is mounted to the camera body will increase. When the refractive power of the fourth lens group is too strong beyond the lower limit, the emerging light beam from the fourth lens group becomes afocal, or even convergent, so ghost is apt to occur and the amount of various aberrations produced increases, which is difficult to correct in good balance by the design of the other lens groups.

The inequalities of condition (2) concern with the refractive power of the front lens group which corresponds to the front part of the relay lens system and has a main aim to achieve a shortening of the total length of the lens in such a manner as to well correct the various aberrations. When the refractive power of the front lens group is too weak beyond the upper limit of the inequalities of condition (2), the physical length of the relay lens system comes to increase. When the refractive power of the front lens group is too strong beyond the lower limit, the emerging light beam from the front lens group becomes too much convergent, so the spherical aberration and the inward coma produced are increased. Hence, the optical performance is lowered objectionably.

The inequalities of condition (3) concern with the ratio of the radius of curvature of the rear lens surface of the first lens to that of the front surface of the second lens in the front lens group, or set forth an appropriate range for the refractive power of the air lens defined by these surfaces, and has a main aim to well correct the on-axis aberrations. When the upper limit of the condition (3) is exceeded, the longitudinal chromatic aberration produced gets larger. When the lower limit is exceeded, the coma gets harder to correct well.

The inequalities of condition (4) set forth an appropriate range for the axial air separation between the front lens group and the rear lens group, so that the on-axis aberrations and the off-axis aberrations are corrected in good balance. When the upper limit is exceeded, the spherical aberration and other on-axis aberrations get harder to maintain excellent. When the lower limit is exceeded, the astigmatism, coma and other off-axis aberrations get harder to correct in good balance with the on-axis aberrations.

Though the present embodiment has been described in connection with an example of application of the aspheric sphere to the first lens in the front lens group, it is to be understood that even when any of the other lenses is selected, equivalent effects will be obtained provided it lies in the front lens group.

The numerical data for three examples 1 to 3 of specific zoom lenses of the invention are given in the tables below for the radii of curvature, R, the axial thicknesses or air separation, D, and the refractive indices, N, and Abbe number, $\nu$, of the glasses of the lens elements with the subscripts numbered consecutively from front to rear. R29 and R30 define a glass block such as a filter.

The equation for the aspheric surface in the coordinates with the X-axis in the axial direction and the H-axis in the perpendicular direction to the optical axis, the direction in which light advances being taken positive, is given by the following expression:

$$X = \frac{(1/R)H^2}{1 + \sqrt{1 - (H/R)^2}} + AH^2 + BH^4 + CH^6 + DH^8 + EH^{10}$$

where R is the radius of curvature of the osculating sphere and A, B, C, D and E are the aspheric coefficients.

Also, the values of the factors in the above-described conditions (1) to (4) for the numerical examples 1 to 3 are listed in Table-1.

| Numerical Example 1: $F = 1-9.38$  $FNo = 1:1.25-1.75$  $2\omega = 51.6°-5.9°$ | | | |
|---|---|---|---|
| R1 = 14.793 | D1 = 0.284 | N1 = 1.80518 | $\nu 1$ = 25.4 |
| R2 = 5.846 | D2 = 1.056 | N2 = 1.60311 | $\nu 2$ = 60.7 |
| R3 = −15.311 | D3 = 0.022 | | |
| R4 = 4.891 | D4 = 0.556 | N3 = 1.69680 | $\nu 3$ = 55.5 |
| R5 = 10.825 | D5 = Variable | | |
| R6 = 16.380 | D6 = 0.125 | N4 = 1.83400 | $\nu 4$ = 37.2 |
| R7 = 1.876 | D7 = 0.537 | | |
| R8 = −2.246 | D8 = 0.102 | N5 = 1.71299 | $\nu 5$ = 53.8 |
| R9 = 2.247 | D9 = 0.397 | N6 = 1.84666 | $\nu 6$ = 23.9 |
| R10 = −18.910 | D10 = Variable | | |
| R11 = −3.676 | D11 = 0.136 | N7 = 1.71999 | $\nu 7$ = 50.3 |
| R12 = 4.372 | D12 = 0.295 | N8 = 1.80518 | $\nu 8$ = 25.4 |
| R13 = 63.754 | D13 = Variable | | |
| R14 = 7.323 | D14 = 0.636 | N9 = 1.60311 | $\nu 9$ = 60.7 |
| R15 = −3.863 | D15 = 0.113 | | |
| R16 = Stop | D16 = 0.227 | | |
| R17 = Aspheric | D17 = 0.750 | N10 = 1.58313 | $\nu 10$ = 59.4 |
| R18 = −6.192 | D18 = 0.089 | | |
| R19 = −4.237 | D19 = 0.170 | N11 = 1.84666 | $\nu 11$ = 23.9 |
| R20 = 47.197 | D20 = 0.017 | | |
| R21 = 2.877 | D21 = 0.715 | N12 = 1.48749 | $\nu 12$ = 70.2 |
| R22 = −10.656 | D22 = 1.678 | | |

-continued

| | | | |
|---|---|---|---|
| R23=−17.727 | D23=0.102 | N13=1.83400 | ν13=37.2 |
| R24=2.234 | D24=0.129 | | |
| R25=5.509 | D25=0.295 | N14=1.60311 | ν14=60.7 |
| R26=−3.417 | D26=0.017 | | |
| R27=2.111 | D27=0.363 | N15=1.57135 | ν15=53.0 |
| R28=−46.983 | D28=0.568 | | |
| R29=∞ | D29=0.681 | N16=1.51633 | ν16=64.1 |
| R30=∞ | | | |

| f | 1 | 3.42 | 9.38 |
|---|---|---|---|
| D5 | 0.1639 | 3.0625 | 4.3001 |
| D10 | 4.3865 | 0.9004 | 0.3896 |
| D13 | 0.3524 | 0.9399 | 0.2131 |

The values of the Aspheric Coefficients:

$R = 4.8449$
$A = 0$
$B = -5.431 \times 10^{-3}$
$C = -8.242 \times 10^{-4}$
$D = 2.068 \times 10^{-4}$
$E = -8.105 \times 10^{-5}$ Numerical Example 2:
$F = 1-9.38$  FNo=1:1.25−1.75  $2\omega = 51.6°-5.9°$

| | | | |
|---|---|---|---|
| R1=14.793 | D1=0.284 | N1=1.80518 | ν1=25.4 |
| R2=5.846 | D2=1.056 | N2=1.60311 | ν2=60.7 |
| R3=−15.311 | D3=0.022 | | |
| R4=4.891 | D4=0.556 | N3=1.69680 | ν3=55.5 |
| R5=10.825 | D5=Variable | | |
| R6=16.380 | D6=0.125 | N4=1.83400 | ν4=37.2 |
| R7=1.876 | D7=0.537 | | |
| R8=−2.246 | D8=0.102 | N5=1.71299 | ν5=53.8 |
| R9=2.247 | D9=0.397 | N6=1.84666 | ν6=23.9 |
| R10=−18.910 | D10=Variable | | |
| R11=−3.676 | D11=0.136 | N7=1.71999 | ν7=50.3 |
| R12=4.372 | D12=0.295 | N8=1.80518 | ν8=25.4 |
| R13=63.754 | D13=Variable | | |
| R14=7.323 | D14=0.636 | N9=1.60311 | ν9=60.7 |
| R15=−3.863 | D15=0.113 | | |
| R16=Stop | D16=0.227 | | |
| R17=Aspheric | D17=0.750 | N10=1.58313 | ν10=59.4 |
| R18=−6.438 | D18=0.104 | | |
| R19=−4.154 | D19=0.170 | N11=1.84666 | ν11=23.9 |
| R20=51.452 | D20=0.017 | | |
| R21=2.872 | D21=0.715 | N12=1.51633 | ν12=64.1 |
| R22=−9.362 | D22=1.656 | | |
| R23=−30.712 | D23=0.102 | N13=1.80518 | ν13=25.4 |
| R24=2.010 | D24=0.133 | | |
| R25=4.766 | D25=0.295 | N14=1.60342 | ν14=38.0 |
| R26=−3.686 | D26=0.017 | | |
| R27=2.038 | D27=0.363 | N15=1.60342 | ν15=38.0 |
| R28=21.291 | D28=0.568 | | |
| R29=∞ | D29=0.681 | N16=1.51633 | ν16=64.1 |
| R30=∞ | | | |

| f | 1 | 3.42 | 9.38 |
|---|---|---|---|
| D5 | 0.1639 | 3.0625 | 4.3001 |
| D10 | 4.3865 | 0.9004 | 0.3896 |
| D13 | 0.3524 | 0.9399 | 0.2131 |

The Values of the Aspheric Coefficients:

$R = 4.7705$
$A = 0$
$B = -5.452 \times 10^{-3}$
$C = -9.316 \times 10^{-4}$
$D = 1.949 \times 10^{-4}$
$E = -9.252 \times 10^{-5}$ Numerical Example 3:
$F = 1-9.38$  FNo=1:1.25−1.75  $2\omega = 51.6°-5.9°$

| | | | |
|---|---|---|---|
| R1=14.793 | D1=0.284 | N1=1.80518 | ν1=25.4 |
| R2=5.846 | D2=1.056 | N2=1.60311 | ν2=60.7 |
| R3=−15.311 | D3=0.022 | | |
| R4=4.891 | D4=0.556 | N3=1.69680 | ν3=55.5 |
| R5=10.825 | D5=Variable | | |
| R6=16.380 | D6=0.125 | N4=1.83400 | ν4=37.2 |
| R7=1.876 | D7=0.537 | | |
| R8=−2.246 | D8=0.102 | N5=1.71299 | ν5=53.8 |
| R9=2.247 | D9=0.397 | N6=1.84666 | ν6=23.9 |
| R10=−18.910 | D10=Variable | | |
| R11=−3.676 | D11=0.136 | N7=1.71999 | ν7=50.3 |
| R12=4.372 | D12=0.295 | N8=1.80518 | ν8=25.4 |
| R13=63.754 | D13=Variable | | |
| R14=7.323 | D14=0.636 | N9=1.60311 | ν9=60.7 |
| R15=−3.863 | D15=0.113 | | |
| R16=Stop | D16=0.227 | | |
| R17=Aspheric | D17=0.909 | N10=1.58313 | ν10=59.4 |
| R18=−3.499 | D18=0.037 | | |
| R19=−3.207 | D19=0.170 | N11=1.80518 | ν11=25.4 |
| R20=27.654 | D20=0.017 | | |
| R21=2.653 | D21=0.715 | N12=1.60311 | ν12=60.7 |
| R22=−21.911 | D22=1.454 | | |
| R23=27.384 | D23=0.102 | N13=1.83400 | ν13=37.2 |
| R24=1.681 | D24=0.147 | | |
| R25=4.572 | D25=0.295 | N14=1.60311 | ν14=60.7 |
| R26=−4.466 | D26=0.017 | | |
| R27=2.015 | D27=0.363 | N15=1.58267 | ν15=46.4 |
| R28=93.461 | D28=0.568 | | |
| R29=∞ | D29=0.681 | N16=1.51633 | ν16=64.1 |
| R30=∞ | | | |

| f | 1 | 3.42 | 9.38 |
|---|---|---|---|
| D5 | 0.1639 | 3.0625 | 4.3001 |
| D10 | 4.3865 | 0.9004 | 0.3896 |
| D13 | 0.3524 | 0.9399 | 0.2131 |

The Values of the Aspheric Coefficients:

$R = 4.8160$
$A = 0$
$B = -5.440 \times 10^{-3}$
$C = -1.092 \times 10^{-3}$
$D = 3.687 \times 10^{-4}$
$E = -1.189 \times 10^{-4}$

TABLE-1

| | | Numerical Example | | |
|---|---|---|---|---|
| Condition | Factor | 1 | 2 | 3 |
| (1) | f4/fw | 4.286 | 4.286 | 4.286 |
| (2) | f5F/fw | 4.939 | 4.625 | 4.016 |
| (3) | R5,2/R5,3 | 1.461 | 1.550 | 1.091 |
| (4) | (D5F − D5R)/fw | 1.679 | 1.659 | 1.455 |

As has been described above, according to the invention as applied to the 5-component zoom lens, by setting forth proper rules of design for the fourth and fifth lens groups, it has been made possible to realize a zoom lens of a large aperture ratio in the order of F No. 1.2 and a high zoom ratio in the order of 10, while still permitting a minimization of the bulk and size of the entirety of the lens system to be achieved in such a manner that high grade imaging performance is preserved, suited to the photographic camera or video camera.

What is claimed is:

1. A zoom lens comprising, from front to rear, a first lens group of positive refractive power, a second lens group of negative refractive power movable along an optical axis for varying the image magnification, a third lens group of negative refractive power movable along the optical axis for compensating for the shift of an image plane resulting from the variation of the image magnification, a fourth lens group of positive refractive power, a stop, and a fifth lens group having an image forming function, said fourth lens group having a lens of which both lens surfaces are convex with the rear surface of strong curvature, and said fifth lens group having a front lens group and a rear lens group with a widest air separation intervening therebetween, said front lens group having a first lens of which both lens surfaces are convex, a negative second lens turning its concave surface toward the front, and a positive third lens of which the front surface is of strong curvature, said rear lens group having a negative fourth lens turning its concave surface toward the rear, a fifth lens of which both lens surfaces are convex, and a positive sixth lens of which the front surface is of strong curvature, and the following conditions being satisfied:

$3.9 < f4/fw < 4.5$ $3.7 < f5F/fw < 5.2$ $1.0 < R5,2/R5,3 < 1.6$ $1.4 < (D5F-D5R)/fw < 1.75$ where f4 and f5F are focal lengths of said fourth lens group and said front lens group respectively, (D5F−D5R) is an axial air separation between said front lens group and said rear lens group, R5,i is a radius of curvature of the i-th lens surface counting from front in said fifth lens group, and fw is the shortest focal length of the entire lens system.

2. A zoom lens according to claim 1, wherein an aspheric surface is applied to said first lens of said front lens group.

3. A zoom lens according to claim 1, wherein said first lens group moves along the optical axis when focusing is performed.

* * * * *

UNITED STATES PATENT AND TRADEMARK OFFICE
CERTIFICATE OF CORRECTION

PATENT NO. : 4,934,796

DATED : June 19, 1990

INVENTOR(S) : Sugiura, et al.

It is certified that error appears in the above-identified patent and that said Letters Patent is hereby corrected as shown below:

Column 3:

Line 58, "comes to" should read --will--.

Signed and Sealed this

Eleventh Day of February, 1997

Attest:

BRUCE LEHMAN

Attesting Officer      Commissioner of Patents and Trademarks